C. E. AKELEY.
MOTION PICTURE TRENCH CAMERA.
APPLICATION FILED APR. 12, 1918.
1,313,243.
Patented Aug. 19, 1919.
5 SHEETS—SHEET 3.
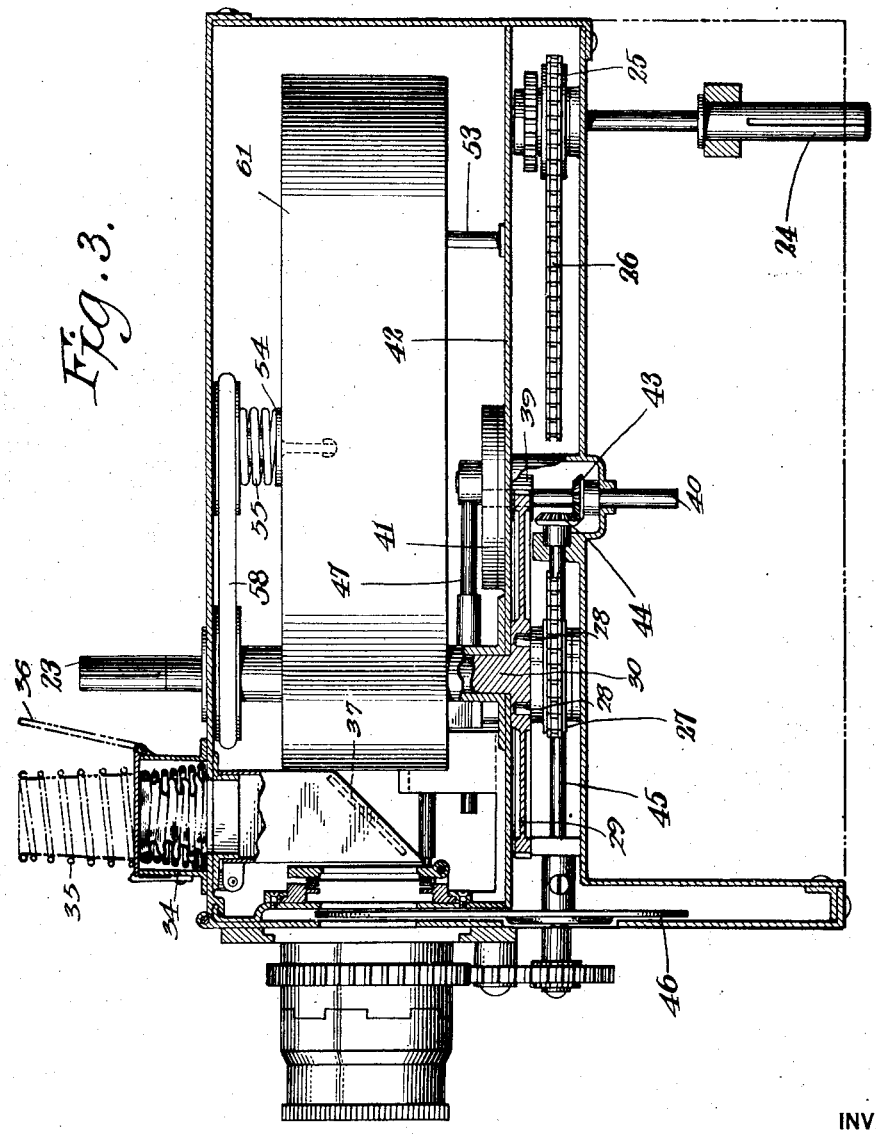
INVENTOR
C. E. Akeley
BY
Kerr, Page, Cooper & Hayward
ATTORNEY C. E. AKELEY.
MOTION PICTURE TRENCH CAMERA.
APPLICATION FILED APR. 12, 1918.
1,313,243.
Patented Aug. 19, 1919.
5 SHEETS—SHEET 4.
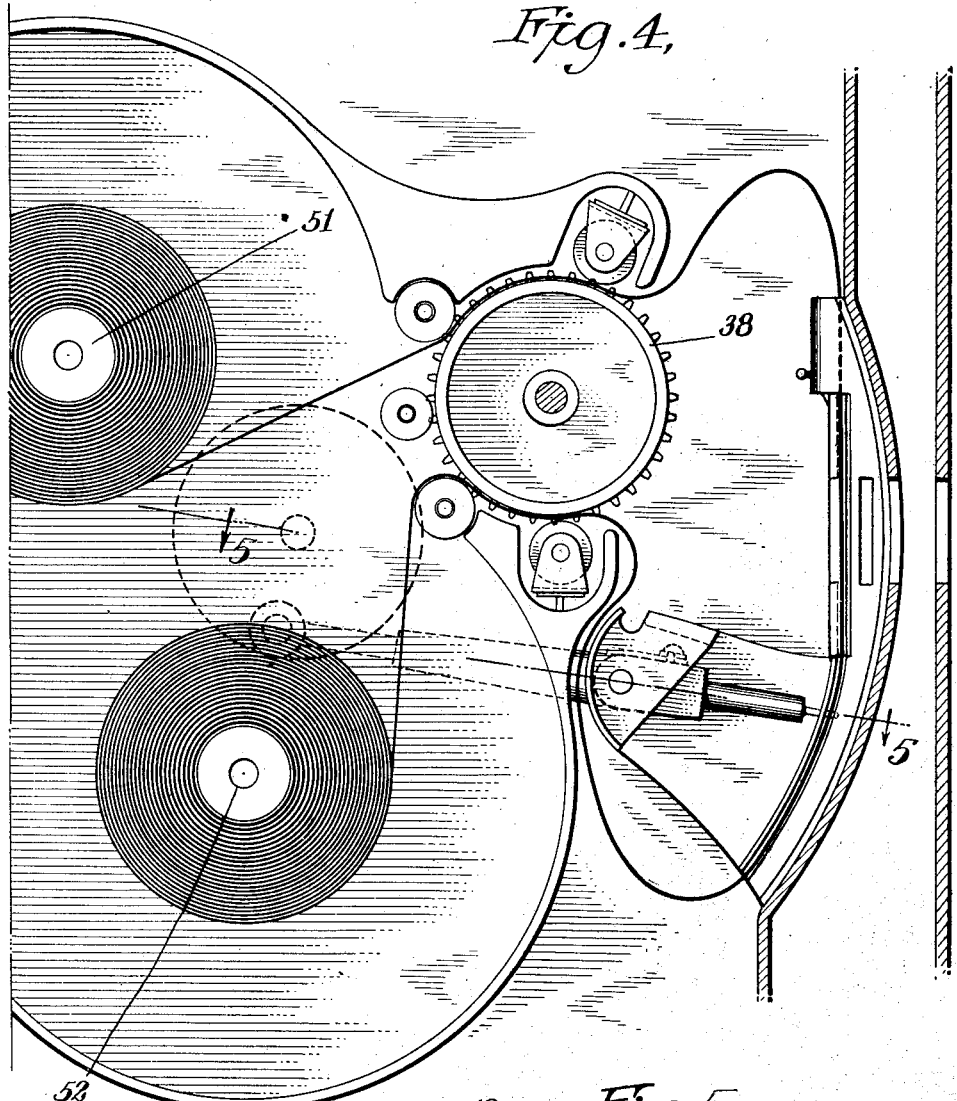
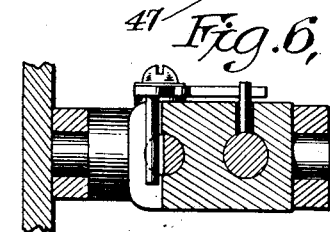
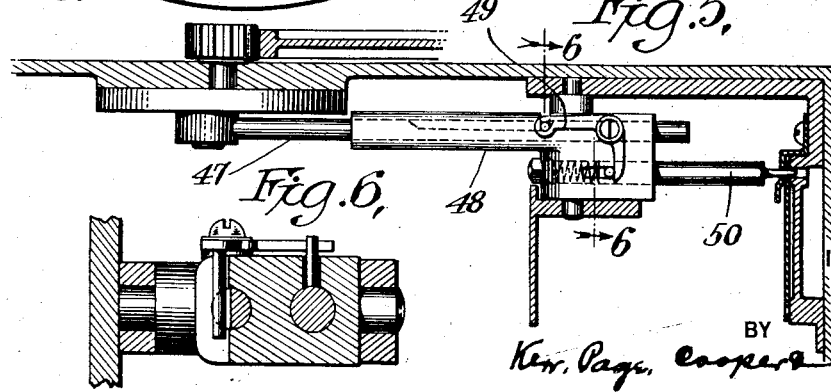
INVENTOR
C. E. Akeley
BY
Kerr, Page, Cooper & Hayward
ATTORNEY C. E. AKELEY.
MOTION PICTURE TRENCH CAMERA.
APPLICATION FILED APR. 12, 1918.
1,313,243.
Patented Aug. 19, 1919.
5 SHEETS—SHEET 5.
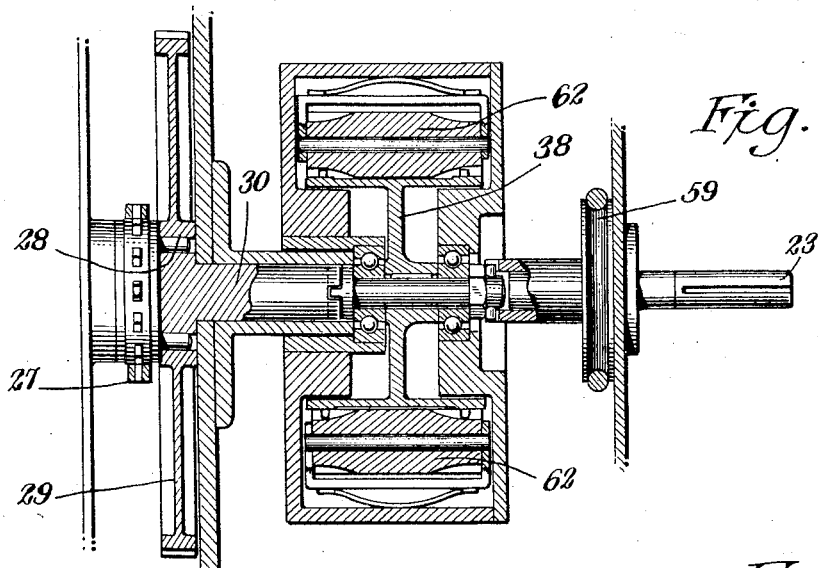
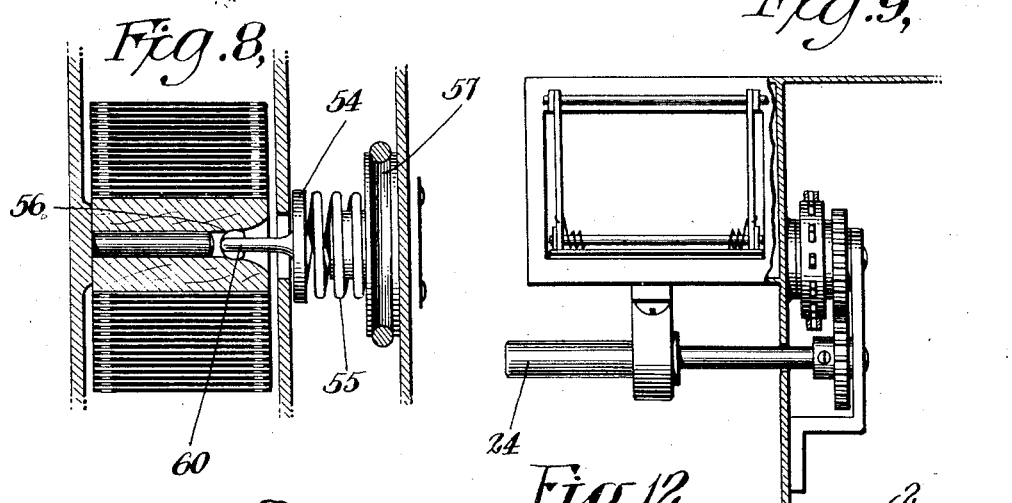
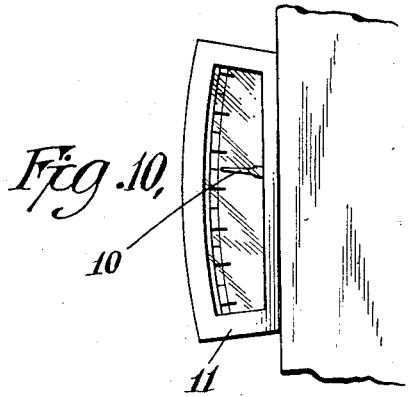
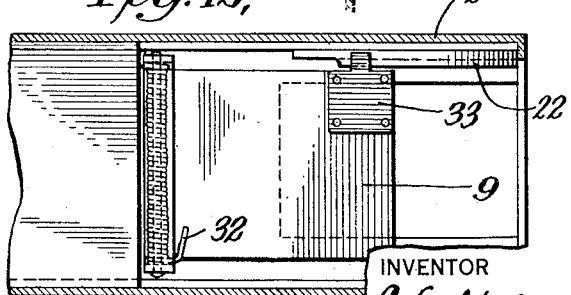
INVENTOR
C. E. Akeley
BY
Kerr, Page, Cooper & Hayward
ATTORNEY

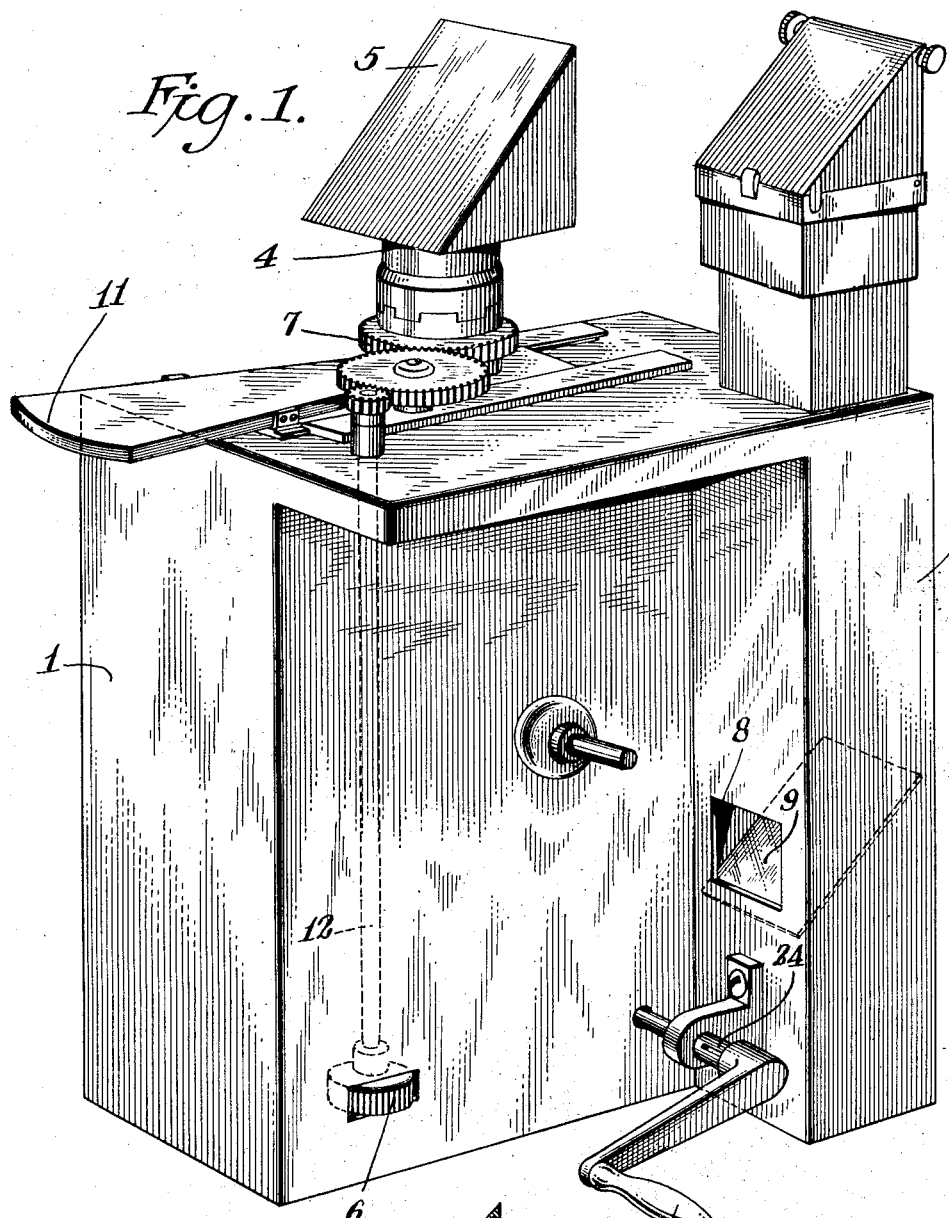

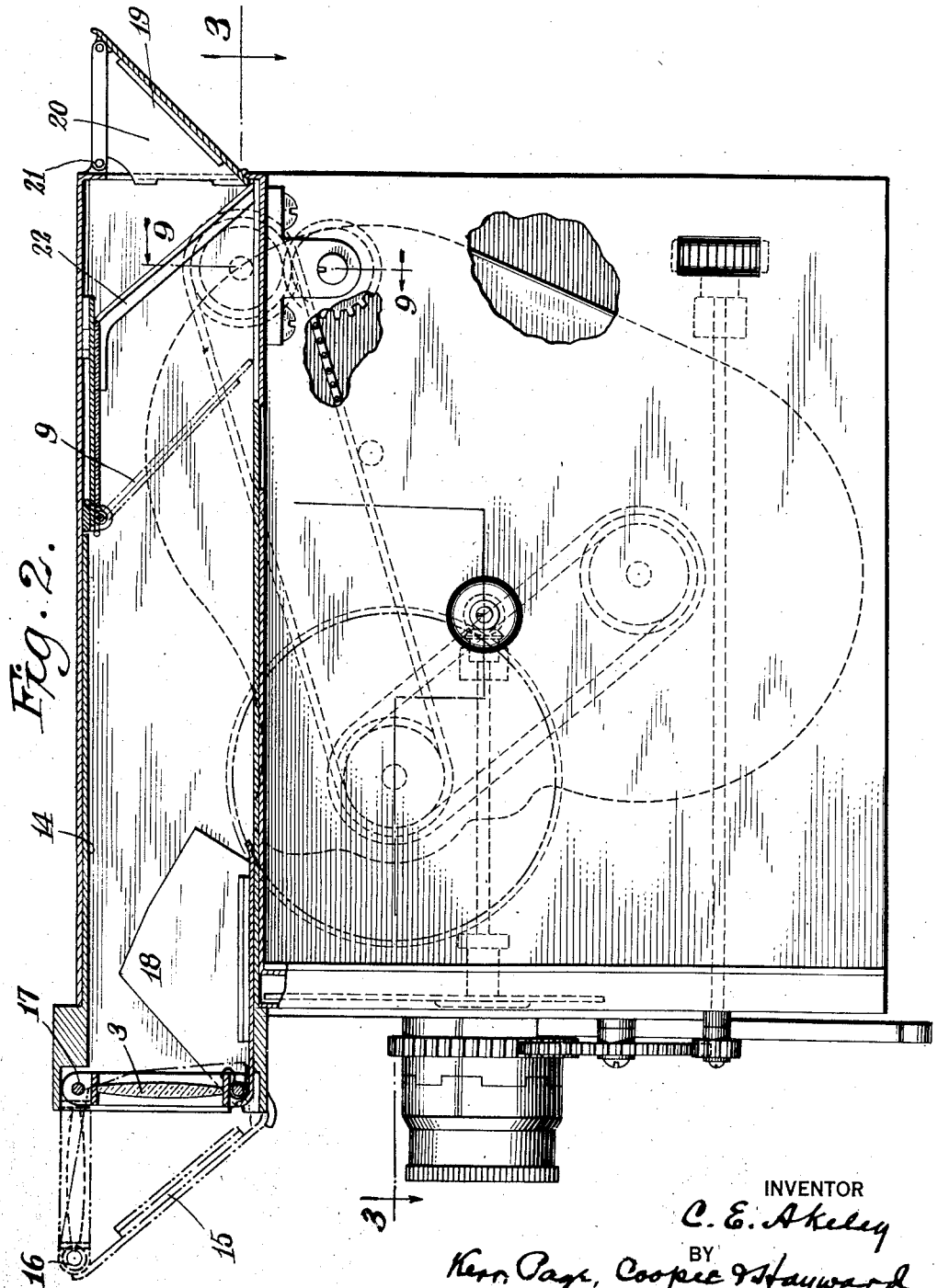

UNITED STATES PATENT OFFICE.

CARL E. AKELEY, OF NEW YORK, N. Y., ASSIGNOR TO AKELEY CAMERA INC., OF NEW YORK, N. Y., A CORPORATION.

MOTION-PICTURE TRENCH-CAMERA.

1,313,243.   Specification of Letters Patent.   Patented Aug. 19, 1919.

Application filed April 12, 1918. Serial No. 228,093.

*To all whom it may concern:*

Be it known that I, CARL E. AKELEY, a citizen of the United States, residing at New York, county and State of New York, have invented certain new and useful Improvements in Motion-Picture Trench-Cameras, of which the following is a full, clear, and exact description.

The invention which is made the subject of this application for Letters Patent is an improvement in motion picture cameras. It is intended for general use, but it is specially devised and designed for use in military trenches and the like, where it is necessary for the operator to keep below the top of the sand bags, bank or some protective barrier while photographing objects over in front, and to practically conceal from hostile eyes the camera itself. With these general objects in view I have developed a camera having a movable finder tube in the nature of a periscope the lens holder of which may be raised or lowered to the desired extent with respect to the main body or casing of the instrument so that the lens will direct an image of the objects or scene toward which it may be directed onto a mirror that may be readily observed by the operator at a safe distance below the top of the finder tube.

In conjunction with this finder I use a photographic objective with a detachable prismatic device that will deflect the light rays received horizontally at right angles downward through the objective lens upon the sensitized surface or film within the camera, and means for focusing the objective accessible from below and readily adjusted by an operator under the protection of the wall of a trench or other similar protective structure.

These are the features which mainly distinguish my improved camera, but to adapt it for general use as an ordinary motion picture device, I have introduced certain novel features and accessory parts which will be described by reference to the drawings which are hereto annexed, and in which:

Figure 1 is a perspective of my improved camera as adapted more particularly to trench and similar uses.

Fig. 2 is a vertical section through the casing and the finder of Fig. 1.

Fig. 3 is a view partly in section of the mechanism in the interior of the casing on line 3—3 of Fig. 2.

Fig. 4 is a view partly in section of the film feeding mechanism and the interior of the film box.

Fig. 5 is an enlarged view partly in section of the film feeding devices.

Fig. 6 is a cross sectional view of the same on line 6—6 of Fig. 5.

Fig. 7 is a sectional view of the film controlling sprocket and its attachments shown in Fig. 4.

Fig. 8 is a sectional detail of one of the film spools.

Fig. 9 is a rear detail view of the guide chamber and associated parts.

Fig. 10 is a view of the underside of the device for indicating the adjustment to focus of the photographic lens.

Fig. 11 is a cross sectional view of the prism holding attachment for the objective tube.

Fig. 12 is a horizontal sectional view of the inner portion of the guide tube.

The general nature and purpose of the instrument may best be gained by reference to Figs. 1 and 2. In these figures 1 is the box or casing of the camera, generally and preferably made of sheet aluminum. Along side what with reference to Fig. 1 may be considered as the front right hand corner, is a rectangular compartment or tubular guide 2, in which slides a tube of corresponding shape 14 surmounted by a hinged or movable three sided top portion with a reducing lens 3 in front and a mirror 15 inclined at an angle of forty-five degrees as shown by the dotted lines in Fig. 2.

The top of the camera casing is furthermore furnished with an objective tube 4, carrying a detachable cap 5, which contains a prism 31, for deflecting the horizontal light rays down through the objective and onto a sensitized surface or film within the camera. For securing the proper focus, a spindle is mounted vertically in the casing which carries a milled disk 6 at its lower end, which projects through an opening in the wall of the casing, and at its upper end engages with a set of gears 7, by means of which the adjustment is secured. The special construction of this device need not be elaborated herein as it is made the subject of an application filed by me April 12th, 1918, Serial No. 228,094. It is sufficient for present purposes to state that the gears operate to turn a threaded interior sleeve which carries the lens and by such means adjusts the position of the lens in its tube.

In use, the finder tube is moved up above the casing to the desired distance, and the scene in front is reflected to the eye of the operator through an opening 8 by means of an inclined mirror 9 spring hinged to the wall of tube 2. By the manipulation of the milled disk 6 the photographic objective is then properly focused, its adjustment being indicated by a pointer 10, Fig. 10, in an overhanging casing 11 and the handle 13 is then turned to operate the shutter and feed the film. The relations of the finder and the photographic objective are permanently such that the scene reflected by the mirror 9, and under observation by the operator, will be projected upon the sensitized surface of a film moved intermittently across the field of exposure.

It will be seen that in this use of the instrument the only parts that need project above the level of the trench are the finder tube and the photographic objective and these may be camouflaged so as not to be observed. The operator may be safely concealed and protected and may focus and operate the instrument without exposure of any part of his person.

For other than trench uses the parts of the camera about to be described are adjusted to different positions. For example to make of the instrument a camera for ordinary conditions of use, the finder tube 14 is forced home in its compartment, to the position shown in Fig. 2., and the side of the top portion carrying the mirror 15, and which is spring hinged at 16 to the lens holder 17, and which has connected to it the side plates or walls 18, is forced into the tube 14, sliding over the wall of the same, into the position shown in full lines in Fig. 2. This brings the lens 3 directly across the opening of the finder tube and directs the image through the tube onto a mirror 19 fitted over a three sided box 20 pivoted at one corner at 21 to the end of the guide tube 2 and adapted to be pulled out to the position shown in Fig. 2.

When this is done the mirror 9 which is spring hinged to the wall of the tube 2 at 32, Fig. 12, and which has normally a tendency to lie against the wall, is permitted to assume the position shown in full lines in Fig. 2. This mirror, see Fig. 12, has a projecting lug or plate 33 which engages with an inclined guide 22 carried by one of the side walls of the sliding tube 14, and when said tube is drawn out this lug sliding over the guide brings the mirror into the position shown in dotted lines in Fig. 2. The other two, or what may normally be regarded as the front and rear walls of this tube, are cut away so as not to interfere with the pivoted mirror 9 or to cover the opening 8 except when the inner or periscope tube is forced down into the tube 2.

With the adjustment of parts shown in Fig. 2 the handle 13 is transferred to the spindle 23 and the instrument used as any ordinary camera. The mirror 19, it will be observed, is then directly beneath the eye of the operator, who may guide the instrument by the picture thrown thereon.

In order to observe or test the focus of the objective lens when the camera is used for ordinary purposes the attachment shown in Fig. 3 is provided. This comprises a cylinder 34 secured over an opening in the wall of the main casing, and containing an extensible tube 35, which is drawn out or springs out when the pivoted lid or cover 36 is unfastened and through which a view is obtained of an inclined mirror 37 immediately under that part of the translucent film upon which the image is thrown by the objective. When this device is not in use the tube 35 is forced into the cylinder and the lid latched down to close the opening and to exclude light.

As has been explained, to facilitate the manipulation of the instrument, the handle is fitted to spindle 23, when the device is used as an ordinary camera, but is applied to spindle 24 when used as a trench camera. The last named spindle is mounted in suitable bearings and by means of spur gears drives a sprocket wheel 25, which by means of a chain belt 26, transmits motion to a sprocket 27, similarly mounted in the upper part of the instrument. Alongside the sprocket 27 is a disk provided with two projections or pins 28, which engage with a toothed wheel 29 of relatively large diameter, having a shaft 30 which passes through the film controlling sprocket 38, the relation of which to the other parts being shown in Fig. 4 and the details in Fig. 7.

In order that friction may be eliminated as far as possible, this sprocket is mounted on ball bearings, the character of which is immaterial, but for greater facility in dismembering the parts, the shaft on each side of such bearings is separable, any convenient form of clutch being used at both points. The end of the shaft is the spindle 23, and is mounted in bearings in the side wall of the casing.

The toothed wheel 29 meshes with a pinion 39, see Fig. 3, which is on a shaft 40, mounted in the outside wall of the casing and a partition 42. At one end the shaft 40 carries a disk 41, and near its opposite end a bevel gear wheel 43 meshing with a similar wheel 44 and thereby imparting its rotation to a spindle 45, which carries the shutter 46 which is or may be of the usual construction.

To the disk 41 is eccentrically connected a rod 47 which forms part of the film feeding mechanism. This part of the apparatus is not primarily a part of the present invention, but is shown for purposes of illustration, and it need only be said with respect to it, that the rotation of the disk 41 reciprocates and oscillates the rod 47, and thereby oscillates a pivotally mounted sleeve 48 through which said rod passes. The rod 47 is formed with a cam surface as shown in dotted lines and by its to and fro movement raises and lowers a pivoted lever 49 that imparts a corresponding reciprocating motion to a spring seated finger 50 that engages with perforations in a film and feeds the same intermittently across the field of exposure.

The remaining part of the apparatus is the film reservoir or box. This device is made the subject of a separate application and its details are omitted from the drawings, but sufficiently shown for purposes of illustration.

The box 61 is preferably composed of sheet aluminum and is of the general form shown in Figs. 2 and 4. It contains two reels or spools 51 and 52, the former being the storage and the latter the winding spool. When this box is placed in the camera its open portion is passed over the film controlling sprocket 38 as shown in Fig. 4, and it is held against stops 53 by a disk 54, held by a spiral spring 55, surrounding a stud set in bearings in the side wall of the casing. The spring carries a pulley wheel 57 mounted on the stud and driven by a flexible belt 58 from a similar pulley 59 on the prolongation of shaft 30 or spindle 23. The disk 54 carries a flat ended stud 60 that enters a correspondingly shaped hole in the center of the winding spool so that whenever either spindle 23 or 24 is turned to operate the camera, film is wound up on the spool 52.

To load the camera one side of the film box is removed in the dark room, and a reel of unexposed film being introduced, its end is carried over the sprocket 38, through the film guide and back over the sprocket 38, to the winding reel. The usual slack is formed on both sides of the field of exposure. In the drawings spring actuated pressure rolls 62 are shown as bearing on the film sprocket, and other idlers are illustrated, but they need not be further described herein.

It will be observed that while the spindle 23 rotates the wheel 29 by direct connection with the shaft, the spindle 24 accomplishes the same purpose through its driving gears and the belt connection. The film feeding and film winding mechanisms are therefore both operated, to whichever spindle the handle for the instrument may be applied.

The more prominent advantages of this instrument are due to its extremely practical character by reason of which it may be readily and successfully used for field and trench work, a feature which no other device of this character, to my knowledge possesses or has ever been specifically designed to possess. I have not illustrated all of the specific details which in practice are used to facilitate its manipulation, and these may be greatly varied. For example, it is manifestly necessary that one side of the film reservoir, as well as of the main casing, should be removable, to permit access to the interior, and suitable means should be used to lock such sides when closed. These and similar matters, however, are within the ordinary skill of the mechanician to supply.

Having now described my invention, what I claim in this application is as follows:

1. A motion picture trench camera comprising a casing with the proper or usual mechanism for such devices contained therein, of a vertically movable finder tube in the nature of a periscope, an objective tube extending parallel thereto and a prismatic attachment on said tube for directing the light rays received horizontally at right angles through the objective and onto a sensitized surface within the camera casing.

2. A motion picture trench camera comprising a casing with the proper or usual mechanism for such devices contained therein, of a vertical guide tube, a finder tube movable therein to different levels above the casing, a lens and means therein for directing the scene in front down onto a surface where it may be viewed by the concealed and protected operator, a photographic objective tube extending up from the casing and a prismatic attachment therefor in fixed relation to the finder lens and adapted to direct the rays of light received horizontally down through the objective lens onto a sensitized surface within the casing.

3. A motion picture trench camera having a vertically adjustable periscope finder, a vertically extending objective tube, with means for directing the light rays received horizontally onto a sensitized surface within the camera, and a focusing device accessible to the operator at a distance below the top of the instrument.

4. A convertible motion picture trench camera comprising a casing, a normally vertical guide tube for a movable periscope finder, a lens and reflecting mirrors therein, a photographic objective tube with a removable prismatic attachment for deflecting the horizontally received light rays at right angles, the periscope lens and reflecting mirrors being movable through such arcs as to permit the scene to be photographed to be received either directly or at right angles.

5. A periscope finder for a motion picture trench camera comprising a guide tube forming a part of the camera casing, a sliding finder tube therein, a lens and mirror at the top of the tube movable out of the tube to direct the light rays received horizontally down through the tube, and into the tube to permit the light rays to pass through the lens directly through the tube, a movable mirror at the lower part of the tube to receive the deflected rays, and a mirror at the end of the tube to receive the direct rays.

6. A periscope finder for motion picture trench cameras, comprising a guide tube forming a part of the camera casing, a sliding finder tube therein, a lens holder pivoted to the forward edge of such tube, a three sided cap or attachment pivoted to the lens holder and adapted to be pressed into the tube when the lens is turned at right angles thereto, the inclined side of which has an inner mirrored surface, an inclined mirror at the lower portion of the guide tube adapted to swing to the wall of the guide tube when the finder tube is forced into its guide tube, and a pivoted mirror at the end of the guide tube adapted to be set to receive and to reflect the light rays passing directly through the lens in the desired direction.

7. In a motion picture camera, the combination with the camera casing of a guide tube 2, a finder tube 14 sliding therein, the lens 3 pivoted to the guide tube, the inclined mirror 9 pivoted to the wall of the guide tube, the cam guide 22 on one of the walls of the finder tube, adapted when the said tube is forced home in the guide tube to permit the mirror 9 engaging therewith to swing to the wall of the guide tube, these parts being associated and combined for use and operation in the manner herein described.

8. A convertible motion picture trench camera of the kind described having two spindles for driving the film feeding mechanism and each adapted to receive a crank, one of said spindles constituting or being directly connected with the driving mechanism of the instrument and flexible connections between said driving mechanism and the other spindle, the two spindles located on different sides of the camera casing to facilitate the use of the instrument as a trench or as an ordinary camera.

9. A motion picture trench camera comprising a casing, a periscope finder extending up above said casing and adapted to direct the image of the scene in front onto a surface near the bottom of the casing, a photographic objective adapted to direct the light rays from scene onto a sensitized surface within the casing, a focusing device and a crank handle both near the bottom of the casing, whereby the instrument may be used to photograph a scene over a wall or bank without exposure of the instrument or the person operating it.

In testimony whereof I affix my signature.

CARL E. AKELEY.